(12) United States Patent
King et al.

(10) Patent No.: US 7,644,198 B2
(45) Date of Patent: Jan. 5, 2010

(54) DMAC TRANSLATION MECHANISM

(75) Inventors: Matthew Edward King, Pflugerville, TX (US); Peichun Peter Lui, Austin, TX (US); David Mui, Round Rock, TX (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 11/246,585

(22) Filed: Oct. 7, 2005

(65) Prior Publication Data

US 2007/0083680 A1 Apr. 12, 2007

(51) Int. Cl.
G06F 13/28 (2006.01)
G06F 3/00 (2006.01)
G06F 13/00 (2006.01)

(52) U.S. Cl. .................. 710/22; 710/53; 711/118
(58) Field of Classification Search ............... 710/22
See application file for complete search history.

(56) References Cited

U.S. PATENT DOCUMENTS

| 5,301,287 | A | | 4/1994 | Herrell et al. ............... 395/400 |
| 5,347,643 | A | | 9/1994 | Kondo et al. ................ 395/425 |
| 6,070,200 | A | * | 5/2000 | Gates et al. .................... 710/20 |
| 6,128,669 | A | | 10/2000 | Moriarty et al. ................ 710/1 |
| 7,139,882 | B2 | * | 11/2006 | Suzuoki et al. ............. 711/153 |
| 2004/0015622 | A1 | * | 1/2004 | Avery ........................ 710/22 |
| 2004/0064669 | A1 | * | 4/2004 | Browning et al. ........... 711/202 |
| 2005/0169273 | A1 | * | 8/2005 | Gadde ........................ 370/392 |
| 2005/0216610 | A1 | * | 9/2005 | Johns et al. .................. 710/22 |
| 2006/0064516 | A1 | * | 3/2006 | Ellis et al. ..................... 710/22 |

OTHER PUBLICATIONS

Office Action from European Patent Office for application 06 806 853.5-2212, mailed Jul. 30, 2008, 4 pages.
Durda IV, Frank, "DMA: What it is and How it Works," FreeBSD Developers' Handbook, uhclem@FreeBSD.org, 1995, 12 pages.
Office Action from European Patent Office for Application EP 06 806 853.5, mailed Jun. 18, 2009, 4 pages.

* cited by examiner

*Primary Examiner*—Alford W Kindred
*Assistant Examiner*—Zachary K Huson
(74) *Attorney, Agent, or Firm*—Van Leeuwen & Van Leeuwen; Jill A. Paimboeuf

(57) ABSTRACT

An improved DMAC translation mechanism is presented. DMA commands are "unrolled" based upon the transfer size of the DMA command and the amount of data that a computer system transfers at one time. For the first DMA request, a DMA queue requests a memory management unit to perform an address translation. The DMA queue receives a real page number from the MMU and, on subsequent rollout requests, the DMA queue provides the real page number to a bus interface unit without accessing the MMU until the transfer crosses into the next page. Rollout logic decrements the DMA command's transfer size after each DMA request, determines whether a new page has been reached, determines if the DMA command is completed, and sends write back information to the DMA queue for subsequent DMA requests.

22 Claims, 9 Drawing Sheets

| Request Number | MMU Only | ERAT and MMU | Improved Translation Mechanism |
|---|---|---|---|
| 1 | Access MMU | Access ERAT & MMU | Access MMU |
| 2 | Access MMU | Access ERAT | DMAQ |
| 3 | Access MMU | Access ERAT | DMAQ |
| 4 | Access MMU | Access ERAT | DMAQ |
| 5 | Access MMU | Access ERAT | DMAQ |
| 6 | Access MMU | Access ERAT | DMAQ |
| 7 | Access MMU | Access ERAT | DMAQ |
| 8 | Access MMU | Access ERAT | DMAQ |
| 9 | Access MMU | Access ERAT | DMAQ |
| 10 | Access MMU | Access ERAT | DMAQ |
| 11 | Access MMU | Access ERAT | DMAQ |
| 12 | Access MMU | Access ERAT | DMAQ |
| 13 | Access MMU | Access ERAT | DMAQ |
| 14 | Access MMU | Access ERAT | DMAQ |
| 15 | Access MMU | Access ERAT | DMAQ |
| 16 | Access MMU | Access ERAT | DMAQ |
| 17 | Access MMU | Access ERAT | DMAQ |
| 18 | Access MMU | Access ERAT | DMAQ |
| 19 | Access MMU | Access ERAT | DMAQ |
| 20 | Access MMU | Access ERAT | DMAQ |
| 21 | Access MMU | Access ERAT | DMAQ |
| 22 | Access MMU | Access ERAT | DMAQ |
| 23 | Access MMU | Access ERAT | DMAQ |
| 24 | Access MMU | Access ERAT | DMAQ |
| 25 | Access MMU | Access ERAT | DMAQ |
| 26 | Access MMU | Access ERAT | DMAQ |
| 27 | Access MMU | Access ERAT | DMAQ |
| 28 | Access MMU | Access ERAT | DMAQ |
| 29 | Access MMU | Access ERAT | DMAQ |
| 30 | Access MMU | Access ERAT | DMAQ |
| 31 | Access MMU | Access ERAT | DMAQ |
| 32 | Access MMU | Access ERAT | DMAQ |

*FIG. 4*

| | DMA Queue 300 | | | | |
|---|---|---|---|---|---|
| 510 Queue Entry Valid | 520 EA | 530 RA Valid | 540 RPN | 550 Ttype | 560 Transfer Size |
| 570  1 | EA 1 | 1 | RPN 1 | | 4KB |
| 580  1 | EA 2 | 0 | - | | 256B |
| 590  0 | EA 3 | 0 | - | | 32B |
| ⋮ | ⋮ | ⋮ | ⋮ | ⋮ | ⋮ |
| 595  1 | EA N | 1 | RPN N | | 128B |

FIG. 5

DMAC TRANSLATION MECHANISM

BACKGROUND OF THE INVENTION

1. Technical Field

The present invention relates to a system and method for an improved DMA controller translation mechanism. More particularly, the present invention relates to a system and method for storing real page numbers in DMA command fields in order to use the real page numbers during a DMA command rollout.

2. Description of the Related Art

Computer system applications typically specify an effective address or indirect address to store and retrieve data. In order to carry out a data storage or retrieval request, the computer system translates the effective address to a real or physical address, which corresponds to a physical location in memory.

The computer system typically includes a memory management unit (MMU) to provide effective address to real address translation. In one configuration, a DMA queue always accesses the MMU for all load and store instructions for address translation, which increases latency and consumes more power.

Another configuration uses an effective to real address translator (ERAT) in combination with a secondary level MMU. An ERAT includes a lookup table that stores prior address translations. When the DMA queue sends a DMA request (including an effective address) to the ERAT, the ERAT looks in its lookup table for an effective address match. If there is a match, the ERAT provides the corresponding real address, and the MMU access is bypassed. However, if the ERAT does not locate an entry corresponding to the DMA request's effective address, the ERAT sends a "miss" to the MMU which, in turn, performs the same steps as discussed in the first configuration above.

When the MMU identifies a corresponding real page number, the MMU sends the real page number to the ERAT, which the ERAT loads in its table. Using this configuration, the ERAT provides a circuit performance improvement since the MMU does not need to be accessed when the ERAT matches the effective address. However, a challenge found is that in order for the ERAT to get good "hit rates," the ERAT's lookup table must include a large number of entries, which may consume a large amount of power and physical area. In addition, another challenge found is that the ERAT still performs a lookup for each DMA request, which also increases the latency.

What is needed, therefore, is a system and method for an improved effective address to real address translation mechanism.

SUMMARY

It has been discovered that the aforementioned challenges are resolved using a system and method for storing real page numbers in DMA command fields in order to use the real page numbers during a DMA command rollout. A DMA queue receives real page numbers from a memory management unit and stores the real page numbers in corresponding DMA command fields for subsequent DMA requests. As such, the DMA queue does not access the MMU as frequently for address translation that, in turn, increases system performance through lower latency and power consumption.

A DMA queue includes DMA commands that have corresponding DMA command fields that include 1) a queue entry valid bit, 2) an effective address field, 3) a real address valid bit, 4) a real page number field, 5) a transfer type field, and 6) a transfer size field. The queue entry valid bit identifies whether the corresponding DMA command is valid. The effective address field contains the corresponding DMA command's effective address. The real address valid bit identifies whether the real page number in the real page number field is valid. The transfer type field identifies the type of DMA command, such as a load or a store. And, the transfer size field includes the amount of data remaining to transfer.

The DMA queue identifies a DMA command that is ready to issue (e.g. no dependencies). After the command is dispatched from the DMA queue, downstream logic checks the DMA command's corresponding real address valid bit in order to determine whether to access the MMU for address translation. If the DMA command's real address valid bit is set, the real page number included in the real page number field is sent to a bus interface unit through a multiplexer, which is configured to receive real page numbers from the DMA queue. In addition, the DMA queue sends a DMA request (includes an effective address) and command parameters (includes a transfer size) to rollout logic. The rollout logic decrements the transfer size, determines whether the DMA queue may use the existing real page number for subsequent rollout DMA requests, and sends "write back information" to the DMA queue. In turn, the DMA queue stores the write back information into the DMA command's command fields. As such, when the DMA queue "rolls out" the same DMA command and performs another DMA request, downstream logic checks the real address valid bit and, if it is set, extracts the real page number from the DMA command's real page number output, and sends it to the bus interface unit. As a result, the MMU is not accessed as frequently, which improves overall system performance.

In one embodiment, DMA requests are automatically sent to the MMU due to hardware constraints, regardless of the value of the real address valid bit. In this embodiment, the DMA logic uses the real address valid bit along with other parameters to determine if a translation request is required. The translation request or effective address valid request is sent from the DMA logic to the MMU. If this request is asserted, the MMU locates a corresponding real page number and sends a new real page number to the bus interface unit through the multiplexer, which selects the new real page number to output. In addition, the MMU sends the new real page number to the DMA queue, where it is written back into the corresponding real page number field for subsequent DMA requests.

When the MMU performs an address translation, the rollout logic also receives the DMA request as well as command parameters. In turn, the rollout logic decrements the transfer size, determines whether the MMU performed a successful address translation, and sends write back information to the DMA queue, which the DMA queue stores in the DMA command's corresponding command fields for subsequent DMA requests.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 4 is a table showing multiple DMA requests and how address translations are performed based upon three different configurations;

FIG. 5 is a diagram showing a DMA queue with DMA commands and corresponding command fields;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
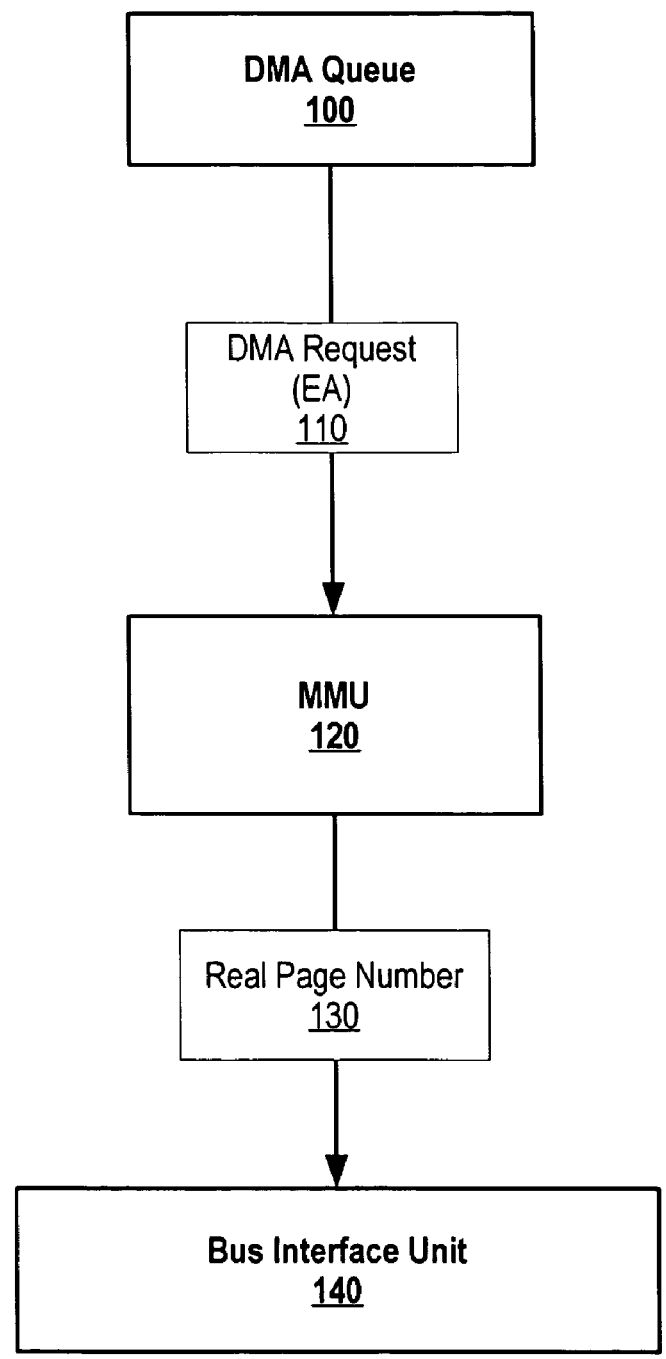
FIG. 1 is a diagram showing a memory management unit (MMU) translating effective addresses into real page numbers.

FIG. 1 is a diagram showing a memory management unit (MMU) translating effective addresses into real page numbers. FIG. 1 shows an address translation configuration used by existing art for processing DMA commands (e.g. memory load and store operations). DMA commands are "unrolled" based upon the transfer size of the DMA command and the amount of data that a computer system transfers at one time. For example, if a computer system transfers data at 128 byte increments, and a DMA command is 512 bytes, the DMA command is unrolled into four DMA requests (128×4=512).

FIG. 1 includes DMA queue 100, MMU 120, and bus interface unit 140. DMA queue 100 identifies a DMA command that is ready to issue (e.g. no dependencies), and sends DMA request 110 to MMU 120, which includes an effective address corresponding to the DMA command. MMU 120 receives DMA request 110 and accesses a lookup table that includes effective addresses and corresponding real page numbers. If the effective address included in DMA request 110 matches a stored effective address in the lookup table, MMU 120 sends corresponding real page number 130 to bus interface unit 140.

On the other hand, if MMU 120 does not find a matching effective address corresponding to DMA request 110, MMU 120 notifies DMA queue 100 that there was a "miss." MMU 120 also requests and loads translation information from memory into the lookup table. After loading is completed, MMU 120 signals DMA queue 100 to resend the same DMA request which missed earlier.

As such, the configuration shown in FIG. 1 performs a lookup or memory access for each DMA request, even if the DMA request is part of multiple DMA requests for the same DMA command, which is inefficient and decreases a processor's performance.

Figure 2:
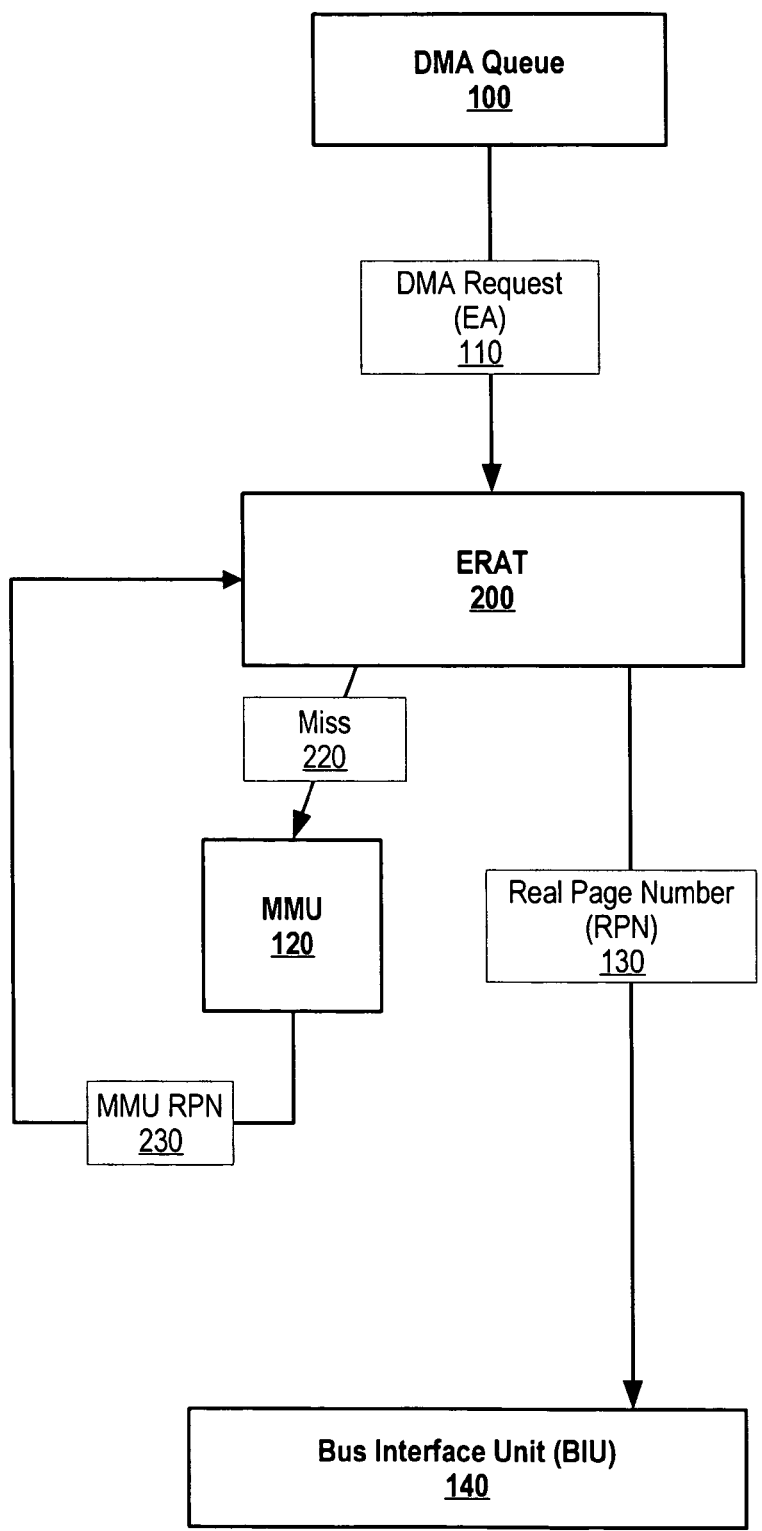
FIG. 2 is a diagram showing an effective to real address translator (ERAT) and a memory management unit (MMU) performing address translation.

FIG. 2 is a diagram showing an effective to real address translator (ERAT) and a memory management unit (MMU) performing address translation. FIG. 2 shows an alternate address translation configuration. ERAT 200 tracks prior address translation results and, therefore, does not access MMU 120 for each DMA request. However, as is discussed below, ERAT 200 still performs a lookup for each DMA request, which is also inefficient in terms of power and area but has improved latency over the configuration in FIG. 1.

DMA queue 100 sends DMA request 110 to ERAT 200 corresponding to a DMA command that is ready to issue, which includes an effective address corresponding to the DMA command. In turn, ERAT 200 accesses a lookup table that contains effective addresses and corresponding real page numbers. ERAT 200 checks to see if the lookup table includes an entry for the effective address included in DMA request 110. If the effective address included in DMA request 110 matches a stored effective address in the lookup table, ERAT 200 sends real page number 130 to bus interface unit 140. DMA queue 100, DMA request 110, real page number 130, and bus interface unit 140 are the same as that shown in FIG. 1.

On the other hand, if ERAT 200 did not find a match corresponding to DMA request 110's effective address, ERAT 200 sends miss 220 to MMU 120. MMU 120 then performs an address translation for the effective address included in DMA request 110.

In turn, MMU 120 accesses its lookup table that includes effective addresses and corresponding real page numbers to see if there is a match for DMA request 110's effective address (e.g. the steps discussed in FIG. 1). If the lookup table contains the effective address, MMU 120 identifies its corresponding real page number (RPN) and sends MMU RPN 230 to ERAT 200. ERAT 200 includes the effective address and MMU RPN 230 in its lookup table for later reference. In addition, the DMA request must be resent. When the request is reissued again, ERAT 200 matches the effective address and supplies the RPN to the bus interface unit. MMU 120 is the same as that shown in FIG. 1.

If MMU 120 does not identify an entry in its lookup table that corresponds to DMA request 100's effective address, MMU 120 accesses memory in order to obtain the correct address translation (e.g. the steps discussed in FIG. 1). Once MMU 120 identifies a real page number to correspond with DMA request 110's effective address, MMU 120 sends MMU RPN 230 to ERAT 200, which ERAT 200 stores in its lookup table. The DMA request must be reissued again, at which time ERAT 200 matches the effective address and supplies RPN 130 to BIU 140. As can be seen, DMA queue 100 accesses ERAT 200 to perform address translation for each DMA request, even if the DMA request is part of multiple DMA requests for the same DMA command.

Figure 3:
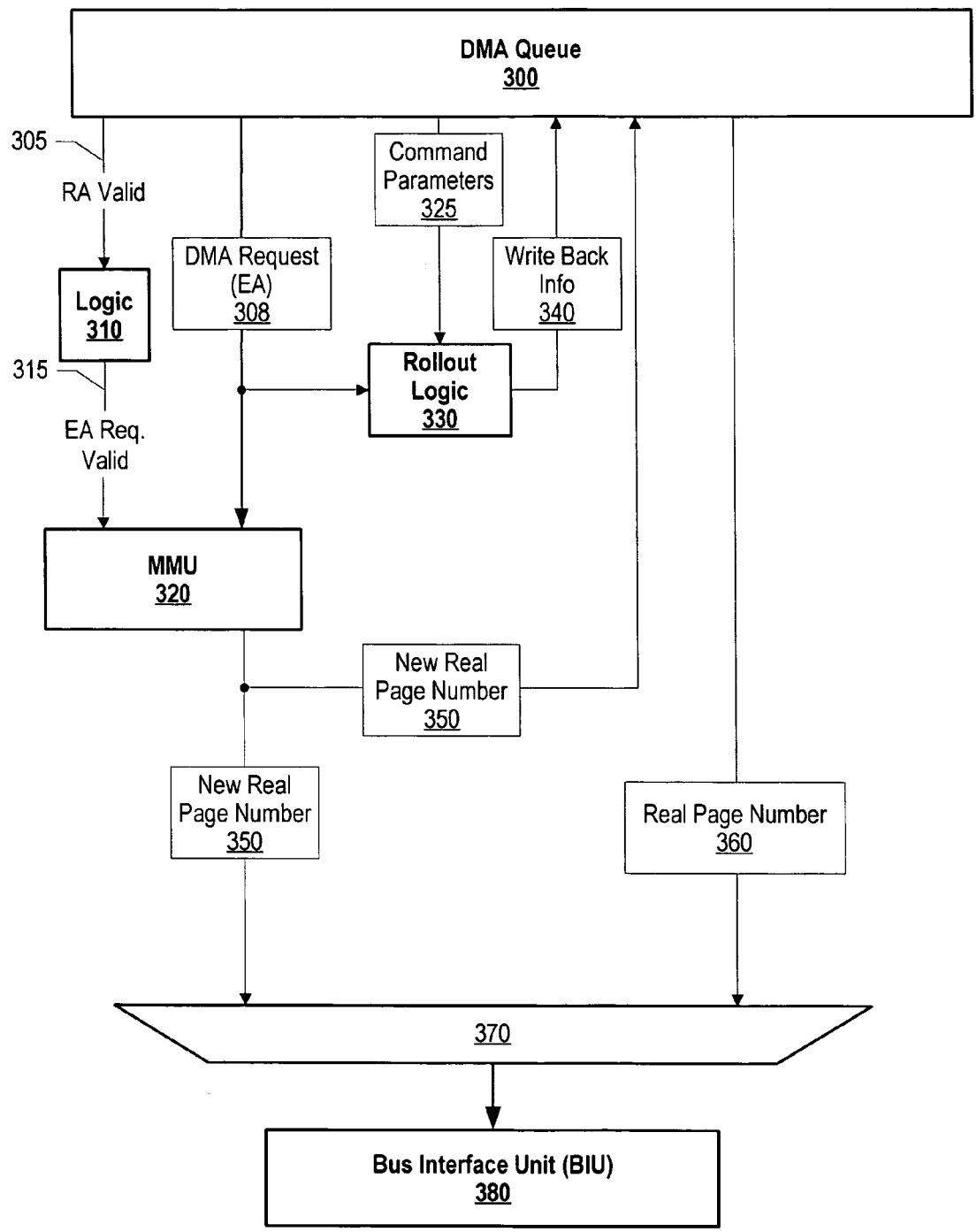
FIG. 3 is a diagram showing a DMA queue receiving a real page number from an MMU and storing the real page number in a corresponding DMA command field for use in subsequent DMA requests.

FIG. 3 is a diagram showing a DMA queue receiving a real page number from an MMU and storing the real page number in a corresponding DMA command field for subsequent DMA requests. As such, the configuration shown in FIG. 3 is more efficient than the configurations shown in FIGS. 1 and 2.

DMA queue 300 includes DMA commands that have corresponding DMA command fields that include 1) a queue entry valid bit, 2) an effective address field, 3) a real address valid bit, 4) a real page number field, 5) a transfer type, and 6) a transfer size field. The queue entry valid bit identifies whether the corresponding DMA command is valid. The effective address field includes the corresponding DMA command's effective address. The real address valid bit identifies whether the real page number included in the real page number field is valid. The transfer type identifies the type of DMA command, such as a load or a store. And, the transfer size field includes the amount of data remaining to transfer (see FIG. 5 and corresponding text for further details regarding DMA command fields).

DMA queue 300 identifies a DMA command that is ready to issue (e.g. no dependencies), and checks the DMA command's corresponding real address valid bit in order to determine whether to access MMU 320 for address translation. If the DMA command's real address bit is set, DMA queue 300 extracts the real page number from the real page number field and sends real page number 360 to bus interface unit 380 through multiplexer 370, which is configured to receive real page numbers from DMA queue 300. In addition, DMA queue 300 sends DMA request 308 and command parameters 325 to rollout logic 330, which include the DMA command's transfer size. Rollout logic 330 decrements the transfer size, determines whether DMA queue 300 may use the existing real page number for subsequent rollout DMA requests, and sends write back information 340 to DMA queue 300 (see FIG. 7 and corresponding text for further details regarding rollout processing). In turn, DMA queue 300 loads write back information 340 into the DMA command's command fields. Therefore, when DMA queue 300 "rolls out" the same DMA command to perform another DMA request, DMA queue 300 checks the real address valid bit and, if it is set, extracts the real page number from the DMA command's real page number field, and sends real page number 360 to bus interface unit 380. As a result, MMU 320 is not accessed as frequently, which improves overall system performance.

Logic 310 controls Effective Address (EA) request valid 315 that is sent to MMU 320, which is based upon several factors. First, in real mode, MMU 320 does not perform any translations and, therefore, EA request valid 315 is de-asserted. Second, command types such as "sync" and "eieio" do not require translation, thus EA request valid 315 remains de-asserted. Third, in the absence of the first two conditions, logic 310 uses RA valid 305 to determine whether EA request valid 315 should be asserted.

When logic 310 identifies that a DMA command's real address valid bit is not set (third aforementioned condition above) and, therefore, requires address translation, logic 310 activates EA request valid 315. Concurrently, DMA queue 300 sends DMA request 308 to MMU 320 from DMA queue 300. In turn, MMU 320 locates a corresponding real page number and sends new real page number 350 to bus interface unit 380 through multiplexer 370, which selects new real page number 350 as an input. In addition, MMU 320 sends new real page number 350 to DMA queue 300, which DMA queue 300 loads into the corresponding real page number field for subsequent DMA requests.

If MMU 320 does not identify an entry in its lookup table that corresponds to DMA request 308's effective address, MMU 320 accesses memory in order to obtain the correct address translation. An MMU issue dependency is set for the DMA command such that the command is not reissued until the MMU has loaded the translation from memory. Once the MMU issue dependency clears, the DMA command reissues and its effective address produces a "hit" See FIGS. 7, 8, and corresponding text for further details).

When logic 310 identifies that RA valid 305 is asserted in the absence of the first two factors (discussed above) for determining the state of EA request valid 315, no translation is required and, therefore, logic 310 does not assert EA request valid 315. In this case, DMA 300 supplies real page number 360 via multiplexer 370 to BIU 380.

Rollout logic 330 receives DMA request 308 and command parameters 325. In turn, rollout logic 330 decrements the transfer size, determines whether MMU 320 performed a successful address translation, and sends write back information 340 to DMA queue 300, which DMA queue 300 stores in the DMA command's corresponding command fields (see FIG. 7 and corresponding text for further details regarding rollout processing).

FIG. 4 is a table showing multiple DMA requests and their address translation locations based upon three different configurations. Table 400 includes columns 420 through 440 that correspond to configurations shown in FIGS. 1-3, respectfully. Columns 420 through 440 include DMA request activity for providing address translation as a DMA command is rolled out. The example shown in FIG. 4 corresponds to a DMA command requesting to transfer 4 KB of data and the computer system transfers data in 128 byte increments. Therefore, in order to execute the DMA command, thirty-two requests (indicated by column 410) are required (128 B×32=4 KB).

Column 420 shows that for the embodiment shown in FIG. 1, the DMA queue accesses a memory management unit for each of the thirty-two requests. Column 430 shows that for the embodiment shown in FIG. 2, the DMA queue accesses an ERAT for the first request that, in turn, accesses an MMU. For the second through $32^{nd}$ request, the DMA queue accesses the ERAT, which provides the real page number from the ERAT's lookup table so the MMU is not accessed.

Column 440 shows that for the invention described herein (FIG. 3), the DMA queue accesses the MMU for the first request, and then provides the real page number to a bus interface unit by itself for the second through $32^{nd}$ request because the DMA queue stores the real page number in the DMA command's corresponding DMA command field after the first DMA request.

FIG. 5 is a diagram showing a DMA queue with DMA commands and corresponding command fields. DMA queue 300 is the same as that shown in FIG. 3, and includes DMA command fields (columns 510 through 560) that correspond to particular DMA commands.

Column 510 includes a queue entry valid bit that signifies whether the corresponding DMA command is valid. The DMA command stays valid until the corresponding data is transferred in its entirety. For example, for a system that transfers data at 128 byte increments and a DMA command requesting to transfer 128 bytes or less of data, the queue entry valid bit stays valid for one transfer and then gets reset. In another example, for a system that transfers data at 128 byte increments and a DMA command requesting to transfer 512 bytes of data, the queue entry valid bit stays valid until four transfers are successfully performed to the bus interface unit (128×4), and then the queue entry valid bit is reset.

Column 520 includes DMA command effective addresses, which are translated into real page numbers and stored in column 540. Column 530 includes a real address valid bit that signifies whether the real page number included in column 540 is valid. Using the above example for a DMA command requesting to transfer 512 bytes of data, on the first transfer the DMA command's real page number field does not have a valid real page number and thus, the real address valid bit is not set. DMA queue 300 receives, on the first transfer, a real page number from an MMU, along with write back information from rollout logic that includes a set real address valid bit. Therefore, on the second through fourth transfers, DMA queue 300 sends the real page number located in column 540 to a bus interface unit and does not access the MMU for the second through fourth data transfers.

Column 550 includes a DMA command's corresponding transfer type, such as whether it is a load or store operation. Other commands that do not require translation by the MMU, such as "sync" and "eieio," may also issue from the DMA queue. Column 560 is a transfer size field that includes DMA command transfer size values. A transfer size value corresponds to the amount of data that remains to be transferred for a corresponding DMA command. Using the above example for a DMA command requesting to transfer 512 bytes of data, before the first transfer the transfer size value is 512 bytes. Before the second transfer, the transfer size value is 384 bytes (512 B–128 B), which is a decremented transfer size that is received from rollout logic (see FIG. 7 and corresponding text for further details regarding decrementing transfer sizes). Before the third transfer, the transfer size value is 256 bytes (384 B–128 B). And, before the fourth transfer, the transfer size value is 128 bytes.

DMA queue 300 includes rows 570 through 595, which correspond to DMA commands. Rows 570 and 595 show that the corresponding DMA commands are valid (column 510) and include valid real addresses (column 530) in column 540. Row 580 shows that the corresponding DMA command is valid (column 510) but does not include a valid real address (column 530) in column 540. Row 590 shows that the corresponding DMA command is not valid (column 510) and does not include a valid real address (column 530) in column 540.

Figure 6:
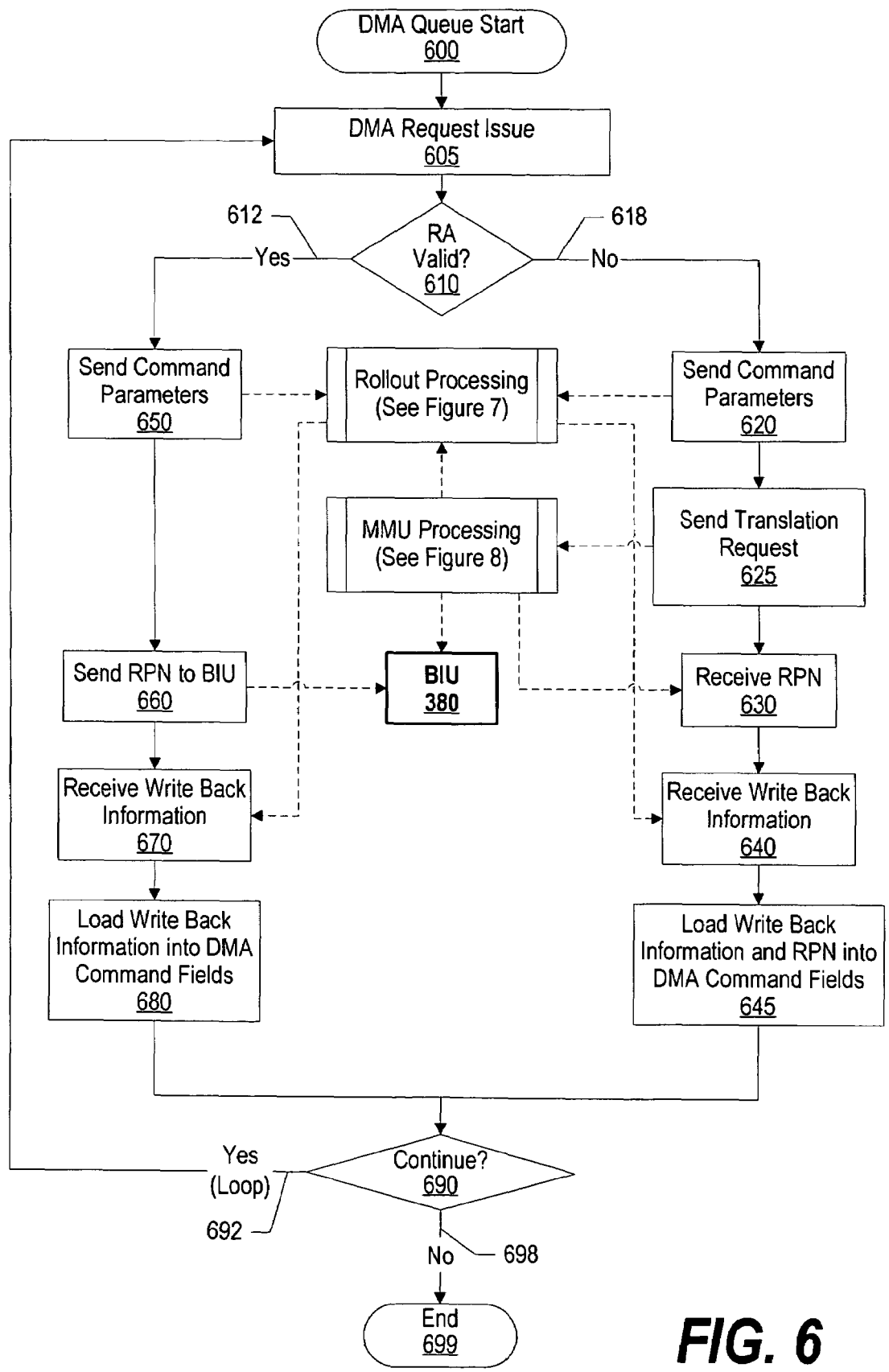
FIG. 6 is a high-level flowchart showing steps taken in sending out or issuing a DMA command.

FIG. 6 is a high-level flowchart showing steps taken in a DMA queue rolling out a DMA command. The DMA queue uses information included in DMA command fields in order to determine whether to send a real page number to a bus interface unit itself or request a memory management unit (MMU) to perform address translation (see FIG. 5 and corresponding text for further details regarding DMA command parameters).

Processing commences at 600, whereupon the DMA queue identifies a DMA command that is ready to issue (e.g. no dependencies) at step 605. A determination is made as to whether the DMA command's corresponding real address valid bit is set, indicating that the DMA command's corresponding real page number is valid (decision 610).

Assuming that that the system is not operating in real mode and that the command type is one that requires address translation, if the DMA command's corresponding real address valid bit is set, decision 610 branches to "Yes" branch 612 whereupon processing sends command parameters to rollout processing at step 650. The command parameters include the real address valid bit value and a transfer size that corresponds to the amount of data that the DMA command wishes to load or store, such as 4 KB of data. Rollout processing receives the command parameters and modifies the command parameters accordingly, such as decrementing the transfer size by a transfer size allowed amount (see FIG. 7 and corresponding text for further details regarding rollout processing steps).

The DMA queue extracts the DMA command's real page number from one of the DMA command field and sends the real page number to bus interface unit 380 at step 660. Bus interface unit 380 is the same as that shown in FIG. 3, and the real page number may pass through a multiplexer, such as multiplexer 370 shown in FIG. 3, before arriving at bus interface unit 380.

At step 670, the DMA queue receives write back information from rollout processing. The write back information includes a real address valid bit and a decremented transfer size as discussed above. The DMA queue loads the write back information into the DMA command's corresponding DMA command fields at step 680 for subsequent DMA requests.

On the other hand, if the DMA queue identifies that the DMA command's real address valid bit is not set, decision 610 branches to "No" branch 618 whereupon the DMA queue sends the command parameters to rollout processing at step 620. At step 625, the DMA queue sends a translation request to memory management unit (MMU), which performs an address translation. The MMU, such as MMU 320 shown in FIG. 3, performs the address translation and sends a real page number to bus interface unit 380. The MMU also provides the real page number to the DMA queue, which DMA queue processing receives at step 630.

In one embodiment, if the MMU did not locate a table entry in its table corresponding to the effective address, the MMU sends a "Miss" to rollout processing and fetches the translation from memory. After loading the translation, MMU processing sends a "Clear Dependency" to the DMA queue to inform the DMA queue to reissue the corresponding command (see FIG. 8 and corresponding text for further details regarding MMU processing).

At step 640, the DMA queue receives write back information from rollout processing and, at step 645, the DMA queue loads the write back information and the real page number into the DMA command fields.

A determination is made as to whether the DMA command is complete (decision 690). If the DMA command requires further rollout (e.g. queue entry valid bit is set), decision 690 branches to "Yes" branch 692, which loops back to continue processing the DMA command. This looping continues until the DMA command is rolled out, at which point decision 690 branches to "No" branch 698 whereupon DMA command processing ends at 699.

Figure 7:
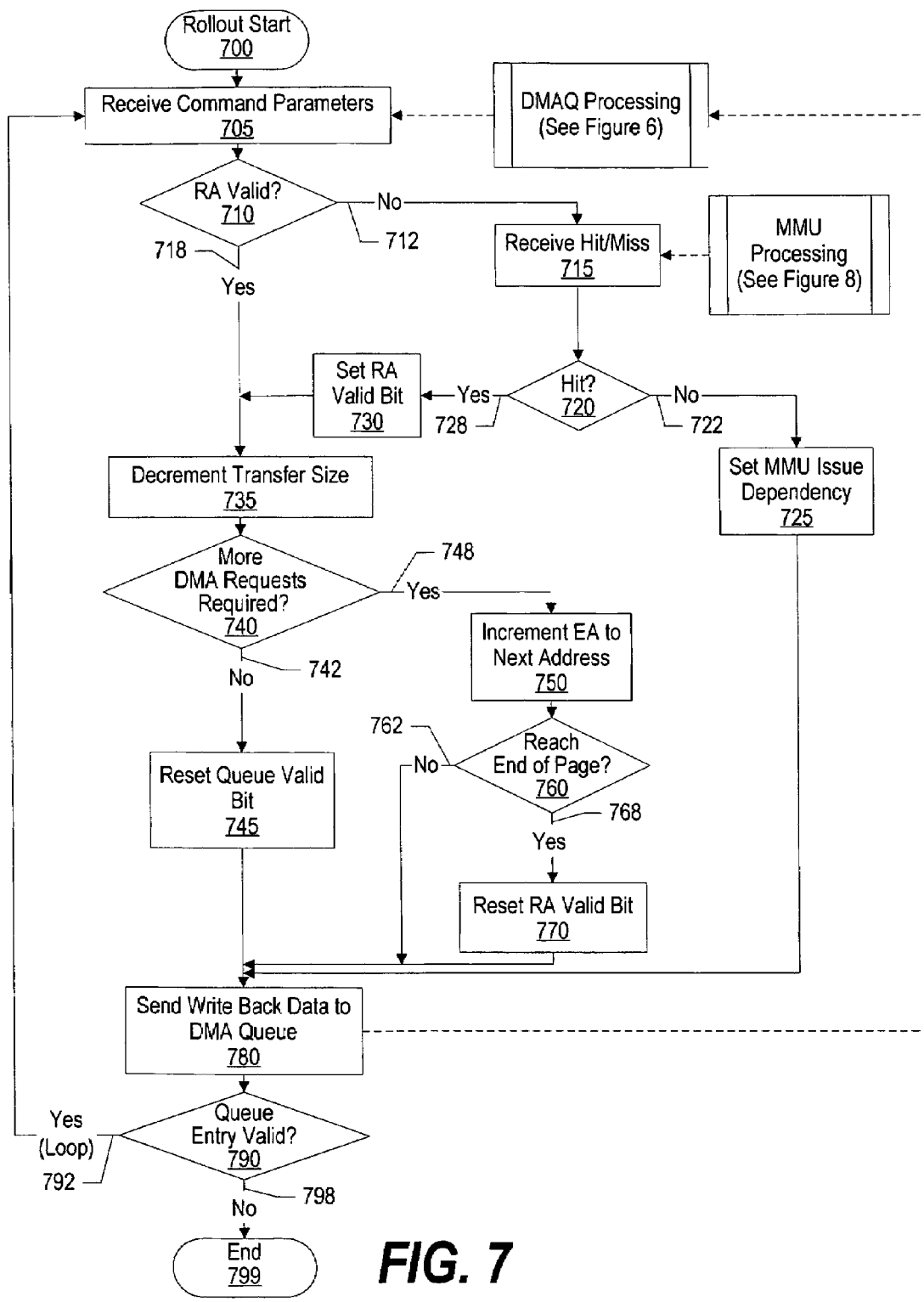
FIG. 7 is a flowchart showing steps taken in rollout processing, such as decrementing a DMA command transfer size and providing write back information to a DMA queue.

FIG. 7 is a flowchart showing steps taken in rollout processing, such as decrementing a DMA command transfer size and providing write back information to a DMA queue. Rollout processing commences at 700, whereupon rollout processing receives command parameters from DMA queue processing at step 705 (see FIG. 6 and corresponding text for further details regarding DMA queue processing). The command parameters include a real address valid bit and a transfer size.

A determination is made as to whether the real page number is valid by checking the state of the real address valid bit (decision 710). When the real address valid bit is set, the DMA queue provides a real page number to a bus interface unit. When the real page number is not set, the DMA queue requests the memory management unit (MMU) to perform address translation and provide the real page number to the bus interface unit and the DMA queue.

If the real page number is valid, decision 710 branches to "Yes" branch 718 whereupon processing bypasses memory management unit request steps. On the other hand, if the real page number is not valid, decision 710 branches to "No" branch 712 whereupon processing receives a hit or miss signal from the MMU at step 715, signifying whether the MMU located a real page number that corresponds to the DMA request's effective address (see FIG. 8 and corresponding text for further details regarding MMU processing).

A determination is made as to whether the MMU performed the address translation (decision 720). If the MMU did not perform the address translation, decision 720 branches to "No" branch 722 whereupon processing sets an MMU issue dependency bit which informs the DMA queue that the particular instruction is dependent upon the MMU performing an address translation (step 725). At a later time when the MMU has received the translation from memory, the MMU sends a signal to the DMA logic to clear the MMU issue dependency. Until the MMU miss clear signal is received from the MMU, the DMA command is not reissued (see FIG. 8 and corresponding text for further details).

On the other hand, if the MMU did perform the address translation, decision 720 branches to "Yes" branch 728 whereupon processing sets the real address valid bit at step 730, which is included in the write back information that rollout processing sends to DMA queue processing (see below).

At step 735, processing decrements the DMA command's transfer size by subtracting a maximum transfer size allowed from the transfer size it received in the command parameters (step 705 above). For example, if the received transfer size is 384 bytes and a maximum transfer size allowed is 128 bytes, the decremented transfer size is 256 bytes. A determination is made as to whether there are more DMA requests required by analyzing the decremented transfer size (decision 740). Meaning, if the decremented transfer size is zero, no more DMA requests are required. However, if the transfer size is not zero, more DMA requests are required in order to complete the DMA command.

If there are no more DMA requests required, decision 740 branches to "No" branch 742 whereupon processing resets a queue valid bit that signifies that the corresponding DMA command has been completed and, therefore, is no longer valid (step 745). On the other hand, if there are more DMA requests required, decision 740 branches to "Yes" branch 748 whereupon processing increments the effective address to the next address at step 750.

A determination is made as to whether the DMA command reaches an end of page (decision 760). For example, a memory configuration may have pages in 4 KB increments. If processing has reached an end of page, decision 760 branches to "Yes" branch 768 whereupon processing resets the real address valid bit at step 770, which informs the DMA queue to request the MMU to perform an address translation for the DMA command's next translation. On the other hand, if processing has not reached an end of page, decision 760 branches to "No" branch 762 bypassing real address valid bit-resetting steps.

At step 780, rollout processing sends write back information to DMA queue processing. The write back information includes recent changes such as a queue valid bit, a real address valid bit, and a decremented transfer size. A determination is made as to whether DMA command requires further DMA requests by checking the queue entry valid bit (decision 790). If the queue entry valid bit is set, decision 790 branches to "Yes" branch 792 whereupon processing loops back to process more DMA requests for the DMA command. This looping continues until the DMA command completes, at which point decision 790 branches to "No" branch 798 whereupon rollout processing ends at 799.

Figure 8:
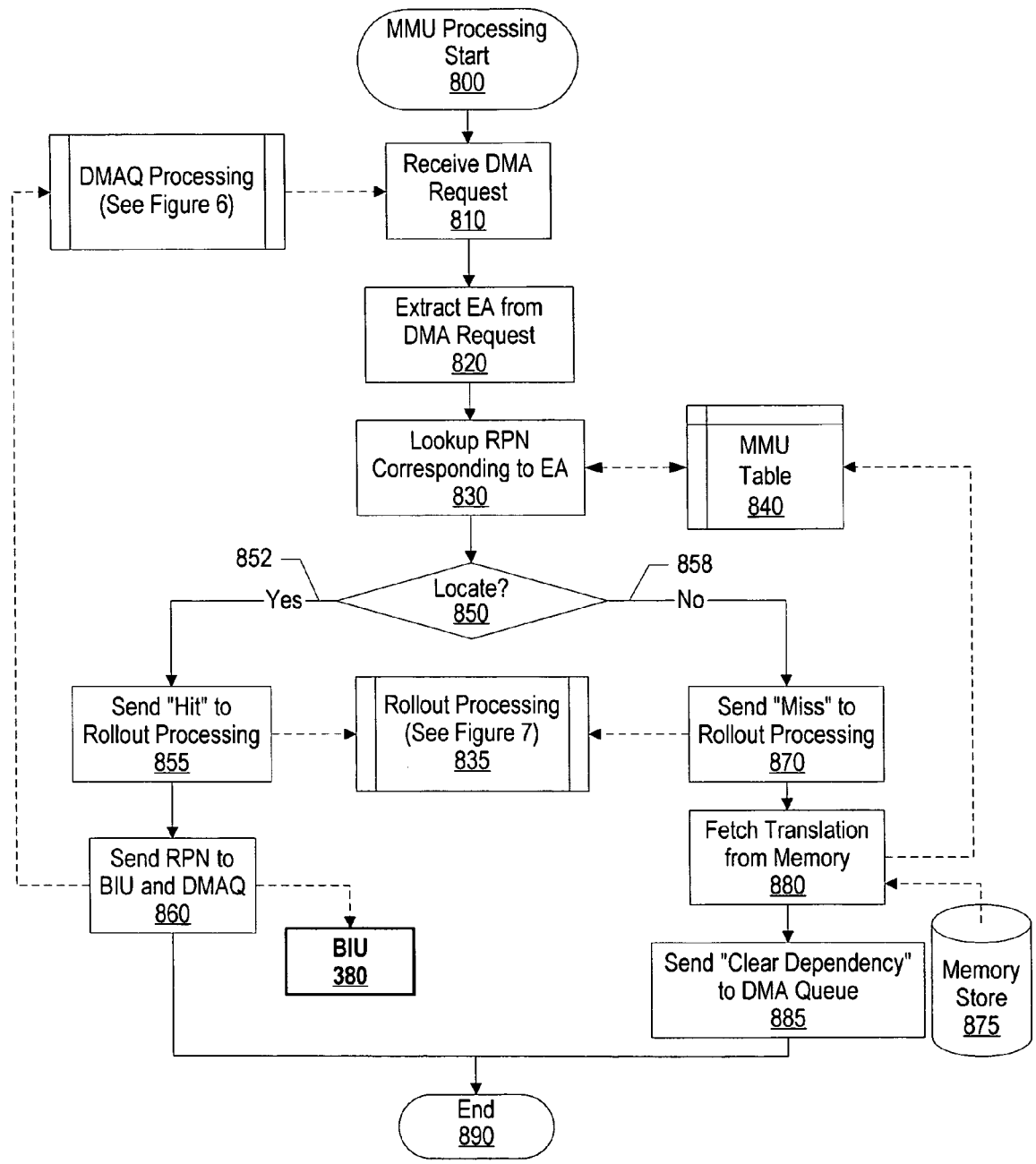
FIG. 8 is a flowchart showing steps taken in a memory management unit receiving a translation request and providing a real page number to a bus interface unit and a DMA queue.

FIG. 8 is a flowchart showing steps taken in a memory management unit receiving a translation request and providing a real page number to a bus interface unit and a DMA queue. Using the embodiment described herein, a DMA queue accesses a memory management unit (MMU) when a DMA command does not include a valid real page number in one of its DMA command fields, the transfer type is one that requires translation, and the system is operating in virtual mode (i.e. real mode inactive).

MMU Processing commences at 800, whereupon the MMU receives a DMA request from the DMA queue at step 810. At step 820, processing extracts an effective address from the DMA request. The MMU accesses MMU table 840 at step 830 to locate a real page number that corresponds to the effective address. MMU table 840 includes a list of effective addresses and corresponding real page numbers.

A determination is made as to whether MMU table 840 included a table entry that corresponds to the effective address (decision 850). If the MMU located a table entry, decision 850 branches to "Yes" branch 852 whereupon processing sends a hit signal to rollout processing at step 855 (see FIG. 7 and corresponding text for further details regarding rollout processing). At step 860, the MMU sends the located real page number to bus interface unit 380 and DMA queue processing, and MMU processing ends at 890. DMA queue processing stores the real page number with the DMA command in order to use the real page number for subsequent DMA requests. Bus interface unit 380 is the same as that shown in FIG. 3.

On the other hand, if the MMU did not locate a table entry in MMU table 840 corresponding to the effective address, decision 850 branches to "No" branch 858 whereupon processing sends a "Miss" to rollout processing (step 870) and fetches the translation from memory store 875, which is loaded into MMU table 840. After loading the translation, MMU processing sends a "Clear Dependency" to the DMA queue at step 885, and MMU processing ends at 890. Memory store 875 may be stored on a nonvolatile storage area, such as a computer hard drive.

Figure 9:
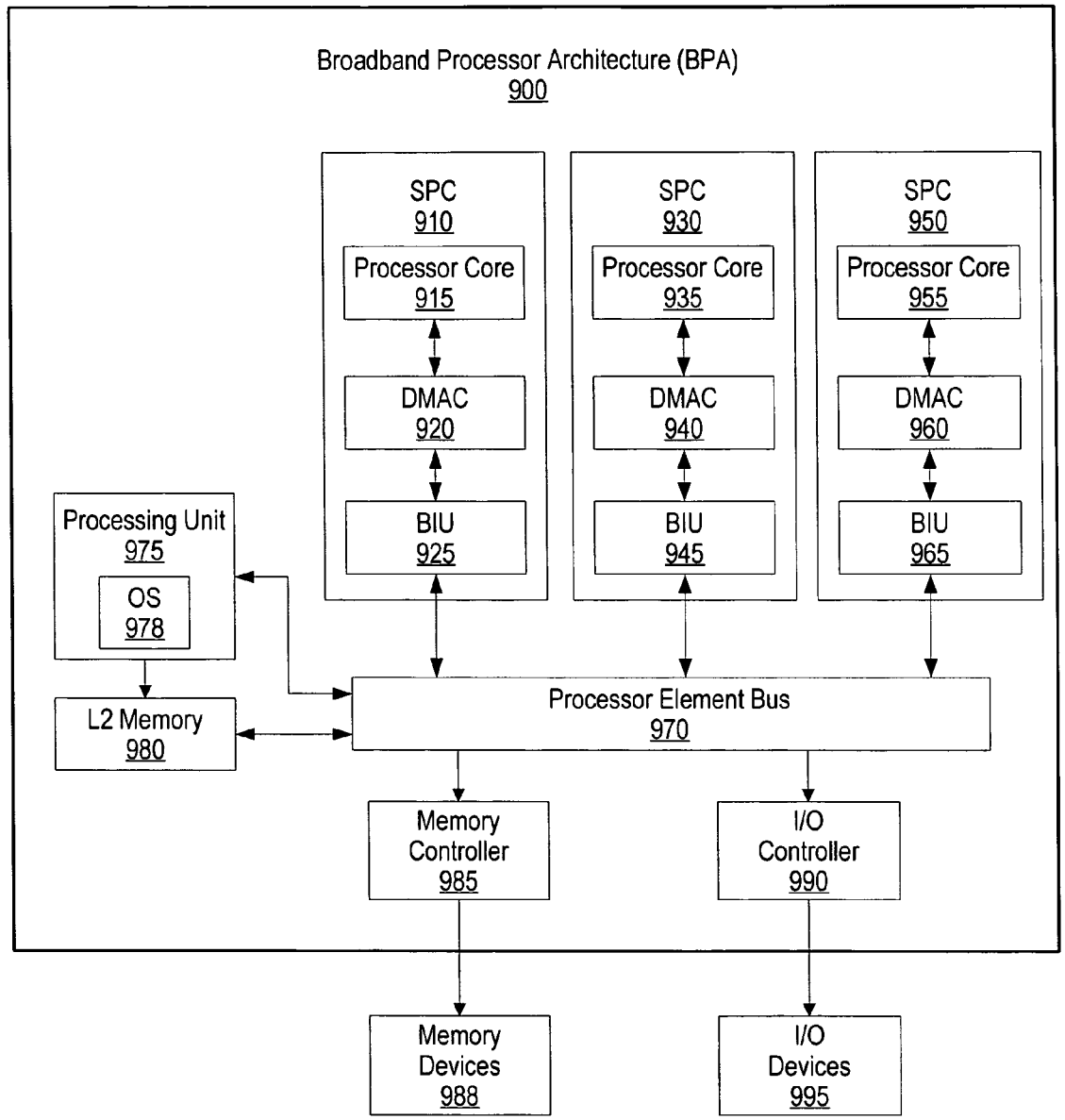
FIG. 9 illustrates an information handling system, which is a simplified example of a computer system capable of performing the computing operations described herein.

FIG. 9 illustrates an information handling system, which is a simplified example of a computer system capable of performing the computing operations described herein. Broadband processor architecture (BPA) 900 includes a plurality of heterogeneous processors on a single chip (system-on-a-chip), a common memory, and a common bus. The heterogeneous processors are processors with different instruction sets that share the common memory and the common bus. For example, one of the heterogeneous processors may be a Power PC using the RISC instruction set, and the other heterogeneous processor may be a synergistic processing unit using a vector instruction set, both sharing the same memory space.

BPA 900 includes synergistic processing units (SPCs) 910, 930, and 950. Each SPC includes a processor core that is coupled to a DMA controller (DMAC), which is coupled to a bus interface unit (BIU). SPC 910 includes processor core 915, DMAC 920, and BIU 925. SPC 930 includes processor core 935, DMAC 940, and BIU 945. And, SPC 950 includes processor core 955, DMAC 960, and BIU 965.

BPA 900 also includes processing unit 975, which runs operating system (OS) 978. For example, processing unit 975 may be a Power PC core that is embedded in BPA 900 and OS 978 may be a Linux operating system. Processing unit 975 manages a common memory map table for BPA 900. The memory map table corresponds to memory locations included in BPA 900, such as L2 memory 980 as well as non-private memory included in SPCs 910, 930, and 950.

Each SPC is used to process data information and each SPC may have different instruction sets. For example, BPA 900 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU). An SPU is preferably a single instruction, multiple data (SIMD) processor, such as a digital signal processor, a microcontroller, a microprocessor, or a combination of these cores. In a preferred embodiment, each SPU includes a local memory, registers, four floating point units, and four integer units. However, depending upon the processing power required, a greater or lesser number of floating points units and integer units may be employed.

SPC 910, 930, and 950 are connected to processor element bus 970, which passes information between control the SPCs, processing unit 975, L2 memory 980, memory controller 985, and I/O controller 990. Memory controller 985 communicates with memory devices 988 for storing and retrieving data, while I/O controller 990 communicates with I/O devices 995, which are peripheral devices.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
selecting, at a DMA (Direct Memory Access) queue, a DMA command, the DMA command including a plurality of DMA command fields, the plurality of DMA command fields including a real page number field and a transfer size field;
determining whether a real page number included in the real page number field is valid;
providing, in response to determining that the real page number is valid, the real page number from the DMA queue to process the DMA command;
identifying a transfer size that is included in the transfer size field, the transfer size indicating an amount of data to be transferred for the DMA command;
detecting a maximum transfer size allowed value that identifies a maximum amount of data capable of being transferred during a DMA request;
subtracting the maximum transfer size allowed value from the transfer size, the subtracting resulting in a decremented transfer size that is greater than zero;
receiving write back information in response to providing the real page number, the write back information including the decremented transfer size and the real page number; and
storing the received real page number in the real page number field and storing the decremented transfer size in the transfer size field, the decremented transfer size indicating the amount of data that remains to be transferred for the DMA command after processing the DMA request.

2. The method of claim 1 further comprising:
checking a real address valid bit included in one of the plurality of DMA command fields that signifies whether the real page number is valid;
sending, in response to determining that the real page number is not valid, a translation request to a memory management unit; and
providing, from the memory management unit, a new real page number to process the DMA command.

3. The method of claim 2 further comprising:
configuring a multiplexer to select the real page number if the real page number is valid and select the new real page number if the real page number is not valid.

4. The method of claim 2 further comprising:
determining whether the memory management unit located a new real page number corresponding to the translation request;
storing, in response to determining that the memory management unit located the new real page number, the new real page number in the real page number field; and
setting the real address valid bit in response to determining that the memory management unit located the new real page number.

5. The method of claim 1 further comprising:
incrementing, after the subtracting, an effective address that corresponds to the DMA command;
determining whether an end of page is reached based upon the incremented effective address; and
resetting a real address valid bit included in one of the plurality of DMA command fields in response to determining that the end of page is reached.

6. The method of claim 1 wherein at least one of the plurality of DMA command fields is selected from the group consisting of a queue entry valid bit field and a real address valid bit field.

7. The method of claim 1 further comprising:
wherein the method is performed using a broadband processor architecture, the broadband processor architecture including a plurality of heterogeneous processors, a common memory, and a common bus; and wherein the plurality of heterogeneous processors use different instruction sets and share the common memory and the common bus.

8. The method of claim 7 wherein the broadband processor architecture is a system-on-a-chip.

9. An information handling system comprising:
one or more processors;
a memory coupled to at least one of the processors;
a nonvolatile storage area coupled to at least one of the processors;
a set of instructions stored in the memory and executed by at least one of the processors in order to perform actions of:
selecting, at a DMA (Direct Memory Access) queue, a DMA command, the DMA command including a plurality of DMA command fields, the plurality of DMA command fields including a real page number field and a transfer size field;
determining whether a real page number included in the real page number field is valid;
providing, in response to determining that the real page number is valid, the real page number from the DMA queue to process the DMA command;
identifying a transfer size that is included in the transfer size field, the transfer size indicating an amount of data to be transferred for the DMA command;
detecting a maximum transfer size allowed value that identifies a maximum amount of data capable of being transferred during a DMA request;
subtracting the maximum transfer size allowed value from the transfer size, the subtracting resulting in a decremented transfer size that is greater than zero;
receiving write back information in response to providing the real page number, the write back information including the decremented transfer size and the real page number; and
storing the received real page number in the real page number field and storing the decremented transfer size in the transfer size field, the decremented transfer size indicating the amount of data that remains to be transferred for the DMA command after processing the DMA request.

10. The information handling system of claim 9 wherein the set of instructions further performs actions of:
checking a real address valid bit included in one of the plurality of DMA command fields that signifies whether the real page number is valid;
sending, in response to determining that the real page number is not valid, a translation request to a memory management unit; and
providing, from the memory management unit, a new real page number to process the DMA command.

11. The information handling system of claim 10 wherein the set of instructions further performs actions of:
configuring a multiplexer to select the real page number if the real page number is valid and select the new real page number if the real page number is not valid.

12. The information handling system of claim 10 wherein the set of instructions further performs actions of:
determining whether the memory management unit located a new real page number corresponding to the translation request;
storing, in response to determining that the memory management unit located the new real page number, the new real page number in the real page number field; and
setting the real address valid bit in response to determining that the memory management unit located the new real page number.

13. The information handling system of claim 9 wherein the set of instructions further performs actions of:
incrementing, after the subtracting, an effective address that corresponds to the DMA command;
determining whether an end of page is reached based upon the incremented effective address; and
resetting a real address valid bit included in one of the plurality of DMA command fields in response to determining that the end of page is reached.

14. The information handling system of claim 9 wherein at least one of the plurality of DMA command fields is selected from the group consisting of a queue entry valid bit field and a real address valid bit field.

15. The information handling system of claim 9 wherein the information handling system is a broadband processor architecture, the broadband processor architecture including a plurality of heterogeneous processors, a common memory, and a common bus; and
wherein the plurality of heterogeneous processors use different instruction sets and share the common memory and the common bus.

16. The information handling system of claim 15 wherein the information handling system is a system-on-a-chip.

17. A computer program product stored in a computer readable medium, comprising functional descriptive material that, when executed by an information handling system, causes the information handling system to perform actions that include:
selecting, at a DMA (Direct Memory Access) queue, a DMA command, the DMA command including a plurality of DMA command fields, the plurality of DMA command fields including a real page number field and a transfer size field;
determining whether a real page number included in the real page number field is valid;
providing, in response to determining that the real page number is valid, the real page number from the DMA queue to process the DMA command;
identifying a transfer size that is included in the transfer size field, the transfer size indicating an amount of data to be transferred for the DMA command;
detecting a maximum transfer size allowed value that identifies a maximum amount of data capable of being transferred during a DMA request;
subtracting the maximum transfer size allowed value from the transfer size, the subtracting resulting in a decremented transfer size that is greater than zero;
receiving write back information in response to providing the real page number, the write back information including the decremented transfer size and the real page number; and
storing the received real page number in the real page number field and storing the decremented transfer size in the transfer size field, the decremented transfer size indicating the amount of data that remains to be transferred for the DMA command after processing the DMA request.

18. The computer program product of claim 17 wherein the information handling system further performs actions of:
checking a real address valid bit included in one of the plurality of DMA command fields that signifies whether the real page number is valid;

sending, in response to determining that the real page number is not valid, a translation request to a memory management unit; and providing, from the memory management unit, a new real page number to process the DMA command.

19. The computer program product of claim 18 wherein information handling system further performs actions of:

configuring a multiplexer to select the real page number if the real page number is valid and select the new real page number if the real page number is not valid.

20. The computer program product of claim 18 wherein the information handling system further performs actions of:

determining whether the memory management unit located a new real page number corresponding to the translation request;

storing, in response to determining that the memory management unit located the new real page number, the new real page number in the real page number field; and setting the real address valid bit in response to determining that the memory management unit located the new real page number.

21. The computer program product of claim 17 wherein the information handling system further performs actions of:

incrementing, after the subtracting, an effective address that corresponds to the DMA command;

determining whether an end of page is reached based upon the incremented effective address; and resetting a real address valid bit included in one of the plurality of DMA command fields in response to determining that the end of page is reached.

22. The computer program product of claim 17 wherein at least one of the plurality of DMA command fields is selected from the group consisting of a queue entry valid bit field and a real address valid bit field.

* * * * *

UNITED STATES PATENT AND TRADEMARK OFFICE
CERTIFICATE OF CORRECTION

PATENT NO.        : 7,644,198 B2                                   Page 1 of 1
APPLICATION NO.   : 11/246585
DATED             : January 5, 2010
INVENTOR(S)       : King et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

Signed and Sealed this

Sixteenth Day of November, 2010

David J. Kappos
*Director of the United States Patent and Trademark Office*